United States Patent
Baer et al.

(10) Patent No.: US 9,382,984 B2
(45) Date of Patent: Jul. 5, 2016

(54) POSITIONING DEVICE AND MEASURING DEVICE

(71) Applicant: KROHNE Messtechnik GmbH, Duisburg (DE)

(72) Inventors: Christoph Baer, Hattingen (DE); Sebastian Baer, Hattingen (DE); Thomas Musch, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 476 days.

(21) Appl. No.: 13/850,791

(22) Filed: Mar. 26, 2013

(65) Prior Publication Data

US 2014/0165751 A1   Jun. 19, 2014

(30) Foreign Application Priority Data

Dec. 14, 2012   (DE) .......................... 10 2012 024 413

(51) Int. Cl.
  *G12B 5/00* (2006.01)
  *F16H 19/08* (2006.01)
  *G01F 23/00* (2006.01)
  *G01F 25/00* (2006.01)

(52) U.S. Cl.
  CPC ............. *F16H 19/08* (2013.01); *G01F 23/003* (2013.01); *G01F 23/0061* (2013.01); *G01F 25/0061* (2013.01); *G12B 5/00* (2013.01); *Y10T 74/18272* (2015.01)

(58) Field of Classification Search
  CPC ................................................... G01F 23/003
  USPC ............................................................. 73/866.5
  See application file for complete search history.

(56) References Cited

U.S. PATENT DOCUMENTS

| | | | |
|---|---|---|---|
| 3,778,738 A * | 12/1973 | Pontis ....................... G01F 3/12 | 335/306 |
| 3,860,930 A * | 1/1975 | Peterson ....................... 343/705 | |
| 4,780,785 A | 10/1988 | Schabert et al. | |
| 4,987,788 A | 1/1991 | Bausch | |
| 5,707,063 A * | 1/1998 | Tzeng et al. ................... 273/440 | |
| 6,123,642 A * | 9/2000 | Saito ....................... B60K 6/48 | 477/3 |
| 6,765,335 B2 | 7/2004 | Wischnewskiy | |
| 6,880,690 B2 * | 4/2005 | Weis ..................... B41F 13/008 | 101/479 |
| 8,215,188 B2 | 7/2012 | Klimenko et al. | |
| 2006/0182602 A1 | 8/2006 | Schuler et al. | |
| 2007/0265499 A1 * | 11/2007 | Wood et al. ................... 600/137 | |

* cited by examiner

*Primary Examiner* — John Fitzgerald
*Assistant Examiner* — Herbert K Roberts
(74) *Attorney, Agent, or Firm* — David S. Safran

(57) ABSTRACT

A positioning for positioning a measuring element (2) and a measuring device with such a positioning device have an object of providing a positioning device for positioning a measuring element or a measuring device with a measuring element and a positioning device that is a simplification compared to the prior art and that meets the requirements for positioning with respect to accuracy and reproducibility. The object is met in the positioning device in that three wheels are provided (3, 4, 5), which are designed as a ring gear (3), a sun and a planetary gear (5). The ring has an interior space (6) in which the sun and the planetary are arranged. Furthermore, the planetary is engaged with the sun and with the ring gear (3).

3 Claims, 3 Drawing Sheets

POSITIONING DEVICE AND MEASURING DEVICE

BACKGROUND OF THE INVENTION

1. Field of the Invention

The invention relates to a positioning device for positioning a measuring element. Furthermore, the invention relates to a measuring device with at least one measuring element for determining and/or monitoring a process variable and with a positioning device for positioning the measuring element. The process variable is, for example, the fill level or the temperature of a medium or a measured object.

2. Description of Related Art

Positioning devices of the aforementioned type are known, for example, from so-called 2.5D coordinate measuring devices. Optical or microwave-based 2.5D coordinate measuring devices known from the prior art are used for contactless measurement of a process variable to be determined at one level so that additional information is obtained for each coordinate of the level. The process variables are, for example, the height perpendicular to the measured level—also signified as fill level—or the respective temperature. Generally, a measured object or a measured medium (such as a liquid or a bulk material) is measured. The identified or monitored or, respectively, general measured process variable represents the half dimension of 2.5-dimensional process as additional information. The positioning of the measuring device or of the measuring element used in each case relative to the measurement level refers to the other two dimensions of the process.

Applications are, for example, material and substance testing in order, inter alia, to check geometrical dimensions of molded parts. Process automation permits such measurement as scanning of the surface of bulk materials in silos, thereby enabling a surface profile reconstruction and a more accurate determination of the fill level.

As a method for measuring the fill level, and thus, determining the amount relative to the measured level, for example, measurement using the radar method is known. The transit time method used by the measuring device is based on the physical laws that the path, for example, of an electromagnetic signal is equal to the product of transit time and velocity of propagation. In the case of measuring the fill level of a medium—for example, a liquid or a bulk material—in a container, the path corresponds to twice the distance between an antenna, which radiates the electromagnetic signal and receives it again, and the surface of the medium. The fill level can be calculated from the difference between the known distance between the antenna and the base of the container and the distance determined by the measurement of the surface of the medium to the antenna. The transmitted and received electromagnetic signals are mostly microwave radiation. The measurement itself, in order to obtain the value of the process variable at the respective selected location in the plane by positioning, can be accomplished by known and tested devices.

The main problem lies in the positioning of the measuring device, and in particular, of the measuring element, which must be aligned, in each case, relative to the measurement plane. In the mentioned measuring devices, which determine the fill level according to the radar method, for example, the antenna for radiating or receiving signals is to be aligned in a suitable manner to different areas.

Here, the positioning accuracy and the reproducibility are of great importance. It is known from the prior art to organize two stepping motor paths at right angles to one another (as so-called XY-cross tables or as XY-support, see, for example, European Patent EP 1 267 425 B1 and corresponding U.S. Pat. No. 6,765,335), so that a scanning of the Cartesian measurement plane is made. In some uses, the measured object is traversed and in others, the measuring element is traversed.

Another possibility is the combination of so-called rotary tables with a uni-axial linear positioning unit. The values of the process variable are recorded via polar coordinates.

In the prior art, a mirror arrangement is often used in the laser measuring method, wherein at least one mirror can be deflected in two directions in space. For the deflection of the mirror or the mirrors, at least two driving elements are also required.

Overall, positioning in the prior art is elaborate, complex, and thus associated with high costs.

SUMMARY OF THE INVENTION

In view of the foregoing, a primary object of the present invention is thus to propose a positioning device for positioning a measuring element or a measuring device with a measuring element and a positioning device that is a simplification as compared to the prior art and that meets the requirements for positioning with respect to accuracy and reproducibility.

The indicated object is initially and essentially achieved in the case of the positioning device in question in that three wheels are provided. A first of the three wheels is designed as a ring gear having an interior space and a center axis. A second of the three wheels is configured as a sun gear, which has a center axis. Finally, a third of the three wheels is designed as a planetary gear. The sun gear and the planetary gear are arranged at least partially in the interior of the ring gear. In particular, the ring gear, the sun gear and the planetary gear are designed, arranged in relation to one another and adapted to one another in such a manner that the planetary gear is engaged with the sun gear and with the ring gear.

For positioning the measuring element by means of the positioning device according to the invention, it is sufficient if only one of the three wheels is actively moved, wherein the arrangement of the wheels relative to one another goes hand in hand with at least one further wheel being moved by the movement of the active wheel. At the same time, only one motor or drive is required to generate the movement. The great advantage of the positioning device, therefore, is that the rotary motion of a drive axle is transferred into two-dimensional movement. Here, in particular, in one design, the ring gear is fixed and only the sun gear can be moved actively, in that it rotates about its center axis. In another design, the ring gear and the sun gear are arranged so that their center axes coincide. The planetary gear is movable both about the axis of its own rotation as well as within the interior of the ring gear.

When the wheels are engaged, this means that there is an interaction between them, which causes the transmission of a rotary movement between the relevant wheels. However, if the wheels are toothed, the wheels are engaged with one another when their teeth touch each other, and thus, mutually set each other into motion. Alternatively, the wheels can also be friction wheels, which can also be engaged with one another, also for transferring rotation.

The ring gear is provided on its inner side facing the interior space with a corresponding structure—e.g., teeth—for engagement. The outside of the sun gear and the planetary gear are accordingly shaped. The positioning device can also be described in that a type of planetary gear is provided. Here, the wheels are either fixed against movement or rotation or they can be brought into self-rotation or even motion in a plane.

In one design, the ring gear and the sun gear are arranged in such a manner relative to one another that the center axes of the ring gear and the sun gear coincide. The sun gear and the ring gear are therefore arranged concentric to one another, wherein the ring gear has a larger outer diameter than the sun gear.

Positioning by the positioning device according to the invention allows, in particular, in one embodiment, a scanning of the level to be measured via so-called hypocycloid figures. Here, the measuring element is guided in a loop-shaped closed curve, so that each point of the measurement plane is accessible.

Cycloid is distinguished in mathematical geometry as the path of a rolling curve that develops when a circle is rolled off a trajectory. Epi- and hypocycloid are special cycloids since the trajectory of the rolling curve represents a wider circle. In epicycloids, the roll-off circle is outside and in hypocycloids inside the trajectory. If, instead of a point on the inner circle, a point outside is used and the path from this point to the middle of the inner circle is rotated, the result is a hypotrochoid.

Both epi- or hypocycloids and hypotrochoids describe a closed curve when the ratio of the radii to one another is rational. For the number of loops n of an outer circle with the radius $r_a$ and an inner radius $r_i$ of the two circles, the following correlation is valid:

$$n = \max(r_a, r_i) / \gcd(r_a, r_i).$$

Thus, the type of scanning can be set using a suitable choice of radii.

In one design, the three wheels are, in particular, found at least partly in a common plane parallel to the measurement level to be scanned.

Further wheels are provided, in one design, in the interior of the ring gear.

One design provides that a guide device with a window is provided and that the ring gear and the guide device are arranged in such a manner relative to one another, so that the center axis of the ring gear extends through the window. The distance between the three wheels and the guide device is predetermined and depends on, for example, the size of the plane to be scanned by the measuring unit.

The guide device is configured, for example, generally in the manner of a flange or of a process connection. This goes hand in hand with the window being formed in a configuration so as to be an opening with a material-free interior space, and that, in an alternative embodiment, it is a kind of passage, for example, for electromagnetic radiation, so that in particular, the process chamber is closed and the process variable can still be measured through the window.

For positioning and scanning of a surface, it is provided according to one design, that the ring gear and the sun gear are arranged relative to one another, so that the center axis of the ring gear and the center axis of the sun gear coincide, in that the sun gear is designed and arranged to rotate around its center axis, that the planetary gear is arranged movably about the sun gear within the interior of the ring gear and arranged so that the ring gear is fixed against movement around its center axis, and that the sun gear rotates about its center axis. In this design, in particular, a cycloid curve—specifically hypocycloid—is scanned of the area to be scanned. For the implementation of the hypocycloid-shaped positioning path, the ring gear is held firmly. Due to the rotation of the sun gear, for which a corresponding drive is required, the planetary gear rotates around the sun gear and additionally performs self-rotation. This results overall in a hypocycloid motion for the measuring element, which is preferably mounted on the edge of the planetary gear.

If the measuring unit is fixed by the window of the guide device specified in the aforementioned design, the result is a hypotrochoid shape of the scanned curve. The distance between the plane of the wheels and the guide device is determinative for the scanned area of the plane, in that this distance describes the magnification with which the movement of the wheels is magnified onto the measured level.

If the surface to be scanned by the positioning device is relatively small, then, in one design, the measuring element is aligned perpendicular to the plane in which the three wheels are found.

Furthermore, the object is also achieved in a further teaching of the invention with a measuring device mentioned above in that the positioning device comprises at least three wheels. The three wheels are designed as a ring gear, sun gear and a planetary gear. The ring gear has an interior space and a center axis. The sun gear has a center axis. The sun gear and the planetary gear are at least partially arranged in the interior of the ring gear. In addition, the ring gear, the sun gear and the planetary gear are designed, arranged in relation to one another and adapted to one another in such a manner that the planetary gear is engaged with the sun gear and with the ring gear. Furthermore, the planetary gear and the measuring element are connected to each other such that the planetary gear moves the measuring element. The measuring element is preferably mounted on the edge of the planetary gear.

The statements made above about positioning also apply accordingly for the measuring device or, respectively, the following embodiments and advantages mentioned above apply mutatis mutandis to the positioning device.

In one design, a guide device with a view window is provided. Here, the ring gear and the guide means are arranged relative to one another in such a manner that the center axis of the ring gear runs through the window and that the measuring element projects through the window. The distance between the guide device and the three wheels of the positioning device is also predetermined.

For the measurement of the process variable according to a further embodiment, the measuring element is designed for transmitting electromagnetic radiation in a beam direction and/or for receiving electromagnetic radiation from the beam direction. The radiation is, in one embodiment, in particular microwaves and, in another embodiment, laser light. In one embodiment, the measuring element is designed in such a manner and arranged relative to the positioning device that the direction of the beam at a predetermined angle of inclination ($\alpha$) is inclined to a plane in which the ring gear is arranged. In an alternative embodiment, the measuring element is essentially perpendicular to the plane of the ring gear.

The scanning of a surface or the measuring of different spatial regions, is achieved in one embodiment in that the ring gear and the sun gear are arranged relative to each other such that the center axis of the ring gear and the center axis of the sun gear coincide, that the sun wheel is rotatable about its center axis, that the planetary gear is designed within the interior of the ring gear to be movable about the sun gear, that the ring gear is fixed against movement around its center axis, and that the sun gear rotates about its center axis. The generation of the rotation of the sun gear is sufficient for the scanning of a two dimensional plane, so that just one drive unit is sufficient for positioning and scanning with the measurement element, and thus the measuring location.

In one design, the contact between the measuring element and the planetary gear is achieved in that the measuring element is connected to the planetary gear via a ball joint. In a supplementary or alternative design, the measuring element is mounted in the window of the guide device via a universal joint.

According to another design, the measurement of the process variable is achieved in that the measuring device for determining and/or monitoring a fill level of a medium is designed according to the radar principle.

In detail, there are a variety of possibilities for designing and further developing the positioning device according to the invention and the measuring device according to the invention. Reference is made to the following description of embodiments, in conjunction with the drawings.

DETAILED DESCRIPTION OF THE INVENTION

Figure 1:
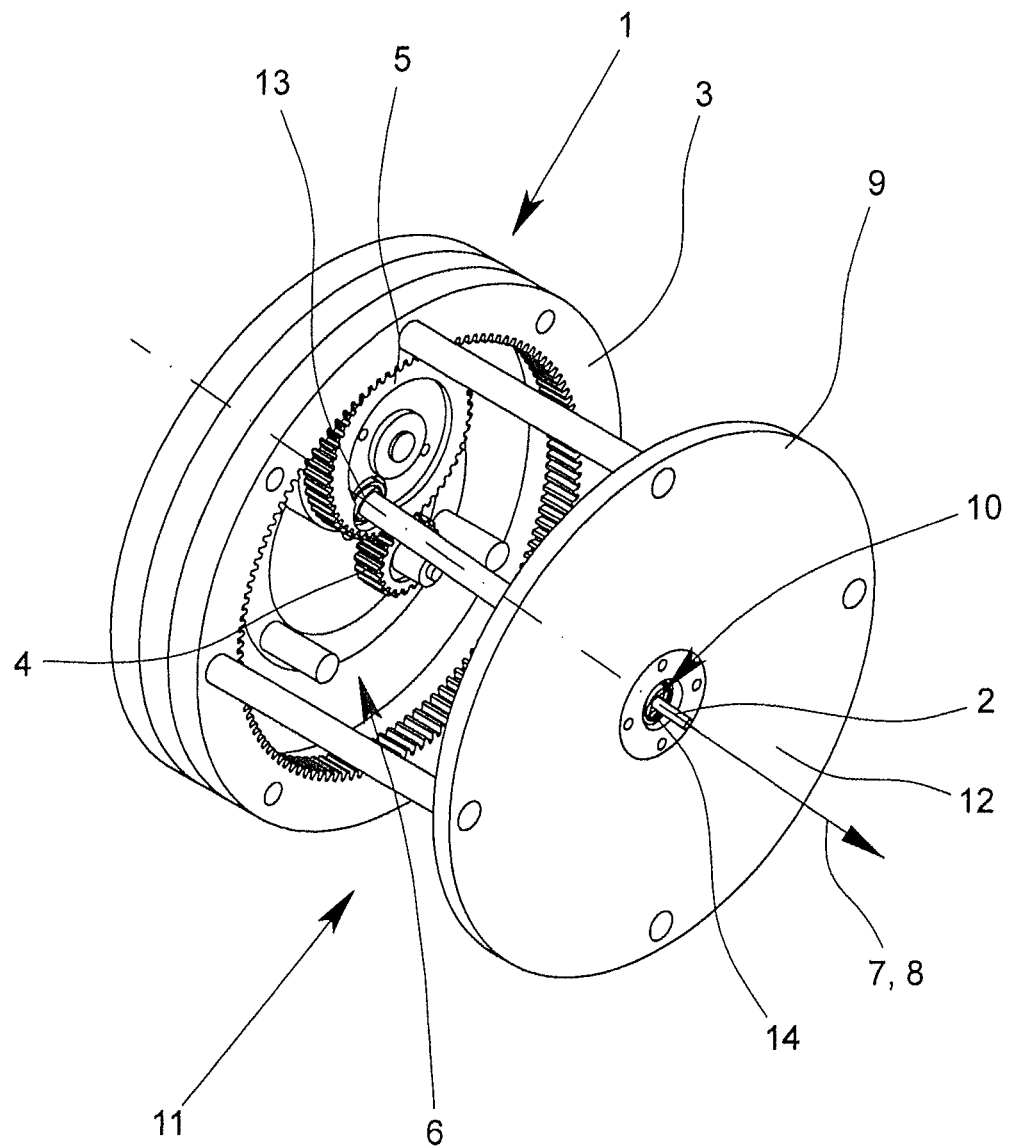
FIG. 1 is a schematic perspective view of a positioning element with a measuring element, essentially illustrative of functional contexts, in a spatial representation.

FIG. 1 shows an embodiment of a positioning device 1, which allows for the positioning or orientation of the measuring element 2 to measure a level. The measuring element 2 is, for example, an antenna that uses the radar method for determining the fill level. Here, the advantage is utilized that, for the scanning of the level, a single driving movement and thus a single drive is sufficient.

For this purpose, the positioning device 1 has three wheels 3, 4, 5, which are designed as a ring gear 3, a sun gear 4 and a planetary gear 5. In the illustrated embodiment, each of the gears is a toothed wheel. The ring gear 3 has a set of teeth on its inner side, which also comprises an interior space 6. The sun gear 4 and planetary gear 5 have sets of teeth on their outsides. The teeth are designed and aligned relative to one another in such a manner that the planetary gear 5 is engaged with the sun gear 4 and the ring gear 3, so that a transfer of torque can take place. The ring gear 3 and the sun gear 4 each have a center axis 7, 8, which coincide due to the arrangement of the ring gear 3 and the sun gear 4, whereby the ring gear 3 coaxially surrounds the sun gear 4.

The planetary gear 5 is freely movable so that, due to rotation of the sun gear 4 about its center axis 8, it turns around its own axis and fully around the sun gear 4 within the inner space 6 of the ring gear 3. A motor—not shown here—is provided for the movement of the sun gear 4.

The measuring element 2 is connected to the edge of the planetary gear 5, which then also follows its movements. In order to further control the movement of the two measuring elements, and therefore, the type of scanning of the measuring plane, a guide device 9 is provided, the measuring element 2 being led through its window 10. Here, the window 10 is located along the center axis 7 of the ring gear 3 or the center axis 8 of the sun gear 4.

This one exemplary embodiment of the measuring device 11 according to the invention.

The direction of the beam 12 of the measuring element 2 is guided by the three wheels 3, 4, 5, wherein a scale, i.e., upscaling or downscaling, of the geometric figure described by the wheels 3, 4, 5 takes place at the level to be measured due to the location of the guide device 9 in the window 10. The magnification factor is dependent on the distance between the level in which the wheels 3, 4, 5 are located and the guide device 9. Here, the distance is determined by the support between the ring gear 3 and the guide device 9. Thus, the distance determines whether a larger or smaller area of the measurement level is measured.

So that the measuring element 2 can be accordingly inclined, it is mounted on the planetary gear 5 with a ball joint 13 and with a universal joint 14 in the window 10.

The type of the scanning results overall from the design of the three wheels 3, 4, 5, from the type of fixing or turnability or movability and from the distance between the wheels 3, 4, 5 and a fixing device 9, which is located between the wheels 3, 4, 5 and the measured object.

Figure 2:
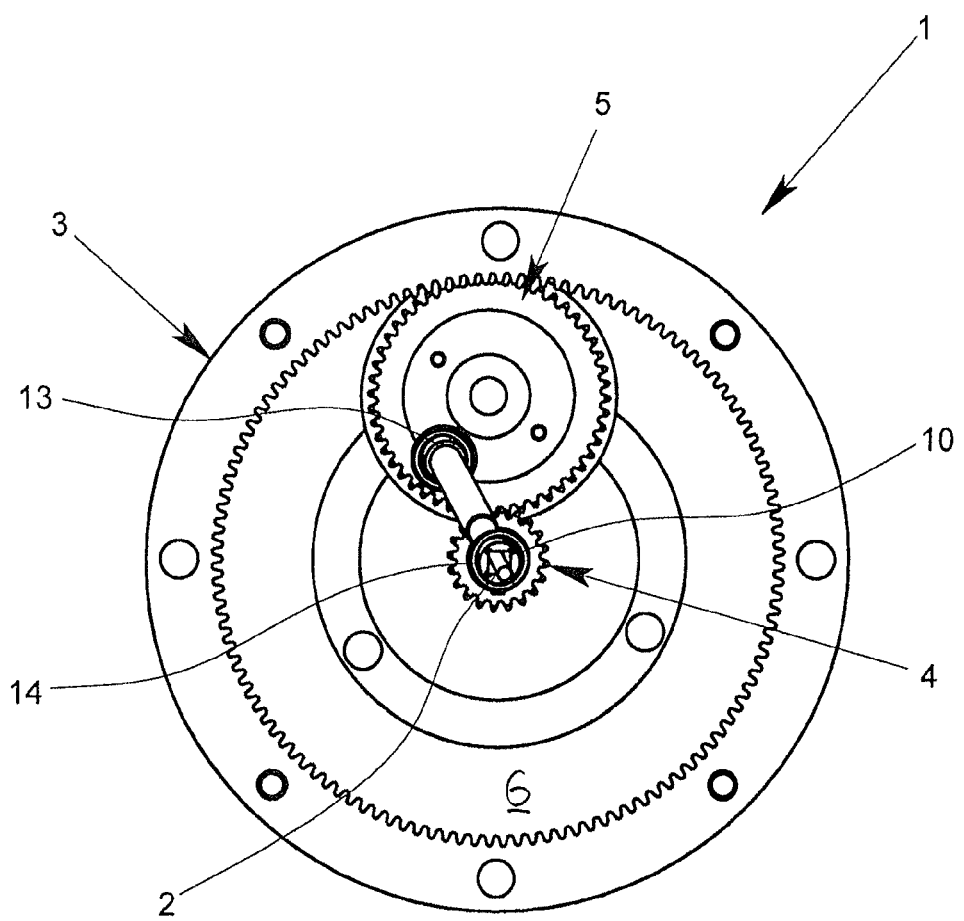
FIG. 2 is a top view of the schematically illustrated positioning device according to FIG. 1.

The arrangement of the three wheels 3, 4, 5 of the positioning device relative to one another can be seen in FIG. 2. The ring gear 3 has an interior space 6 and a set of teeth on the inner wall. The sun gear 4 and the planetary gear 5 are arranged in the interior space 6. The sun gear 4 is located concentrically in the ring gear 3 and rotates around its center axis, which is perpendicular to the plane of drawing here. The planetary gear 5 is engaged with each the sun gear 4 and the ring gear 3 and can rotate around its axis and around the sun gear 4.

Figure 3:
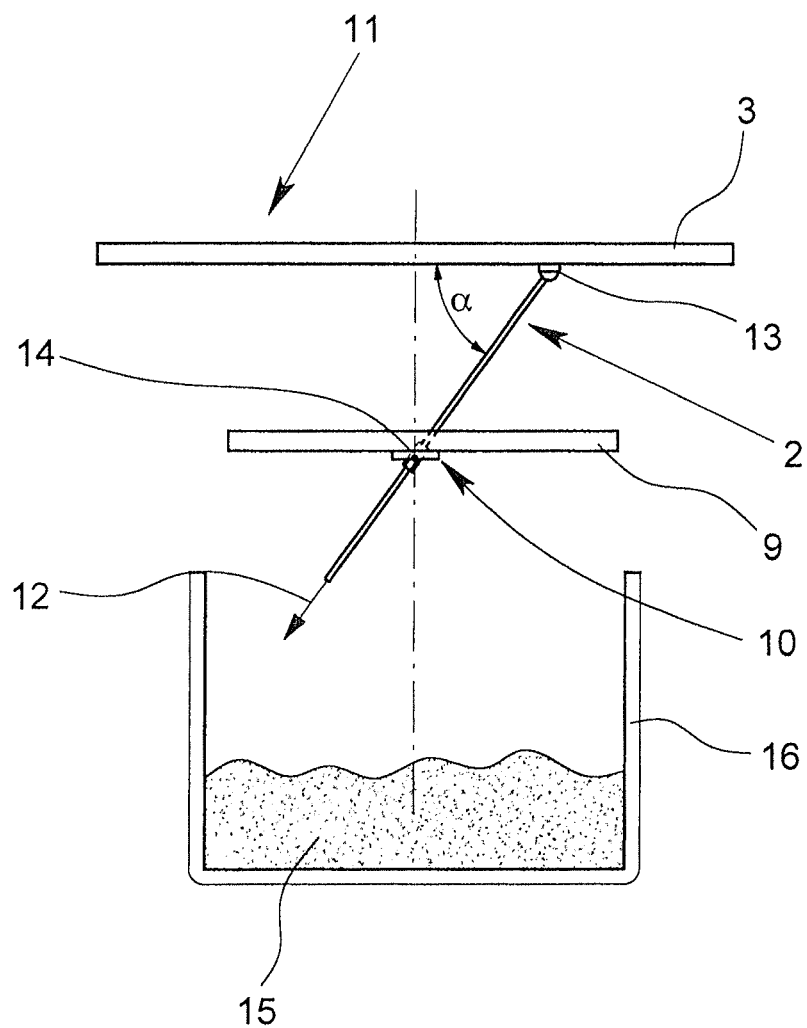
FIG. 3 is a schematic partial sectional view of a fill level measurement with a measuring device, essentially illustrative of functional contexts.

One use of the measuring device 11 for measuring the surface profile of a medium 15 in a container 16 is shown in FIG. 3.

The positioning device 1 is arranged with its ring gear 3 parallel to the level of the medium 15 to be measured, which is, here, in particular, a bulk material.

In the illustrated implementation, the measuring element 2 is the antenna for radiating or receiving electromagnetic radiation, in order to determine the height of the medium 15 or to monitor it using the radar principle. The other elements for generating radiation or evaluation are not shown, for more clarity.

The direction of radiation 12 is guided relative to the measured object, wherein the size of the scanned area results depending on the distance between the ring gear 3 and the guide device 9, the measuring element being guided or held by the window 10, whereby the measuring element 2 is tilted relative to the plane of the ring gear 3 at an inclination angle α. The tilting of the measuring element 2 and the following of the movements of the planetary gear are made possible in that the measuring element 2 is connected to the planetary gear 5 via a ball joint 13 and is mounted in the window 10 of the guide device 9 via a universal joint 14.

What is claimed is:

1. Measuring device, comprising:
at least one measuring element for at least one of determining and monitoring a process variable and
a positioning device for positioning the measuring element having three wheels, a first of the three wheels being a ring gear with an interior space and a center axis, a second of the three wheels being a sun gear with a center axis, and a third of the three wheels being a planetary gear,
wherein the sun gear and the planetary gear are arranged at least partially in the interior space of the ring gear,
wherein the ring gear, the sun gear and the planetary gear arranged and adapted in relation to one another in such a manner that the planetary gear is engaged with the sun gear and with the ring gear, wherein the planetary gear and the measuring element are connected to one another in such a manner that the planetary gear moves the at least one measuring element, further comprising a guide with a window, wherein the ring gear and the guide are arranged in relation to one another such that the axis of the ring gear extends through the window, wherein the measuring element protrudes through the window, wherein the measuring element is adapter for at least one of transmitting electromagnetic radiation in a beam direction and for receiving electromagnetic radiation from the beam direction, wherein the measuring element is arranged relative to the positioning device such that a direction of an emitted beam is inclined at a predetermined angle of inclination relative to a plane in which the ring gear is arranged, and wherein the measuring device is operable according to the radar principle for at least one of determining and monitoring of a fill level of a medium.

2. Measuring device according to claim 1, wherein the ring gear and the sun gear are arranged relative to one another such that the center axis of the ring gear and the center axis of the sun gear coincide, wherein the sun gear is arranged to be rotatable about its central axis and such that the planetary gear is movable within the interior of the ring gear around the sun gear such that the ring is fixed for the movement around its center axis.

3. Measuring device, comprising:

at least one measuring element for at least one of determining and monitoring a process variable and a positioning device for positioning the measuring element having three wheels, a first of the three wheels being a ring gear with an interior space and a center axis, a second of the three wheels being a sun gear with a center axis, and a third of the three wheels being a planetary gear, wherein the sun gear and the planetary gear are arranged at least partially in the interior space of the ring gear, wherein the ring gear, the sun gear and the planetary gear arranged and adapted in relation to one another in such a manner that the planetary gear is engaged with the sun gear and with the ring gear, wherein the planetary gear and the measuring element are connected to one another in such a manner that the planetary gear moves the at least one measuring element, further comprising a guide with a window, wherein the ring gear and the guide are arranged in relation to one another such that the axis of the ring gear extends through the window, wherein the measuring element protrudes through the window, wherein the measuring element is mounted in the window of the guide via a universal joint.

* * * * *